ACTIVATED SLUDGE SYSTEM CAPABLE OF ACCOMMODATING THE FOUR PROCESS VERSIONS DEPICTED IN FIGURES 2,3,4,5

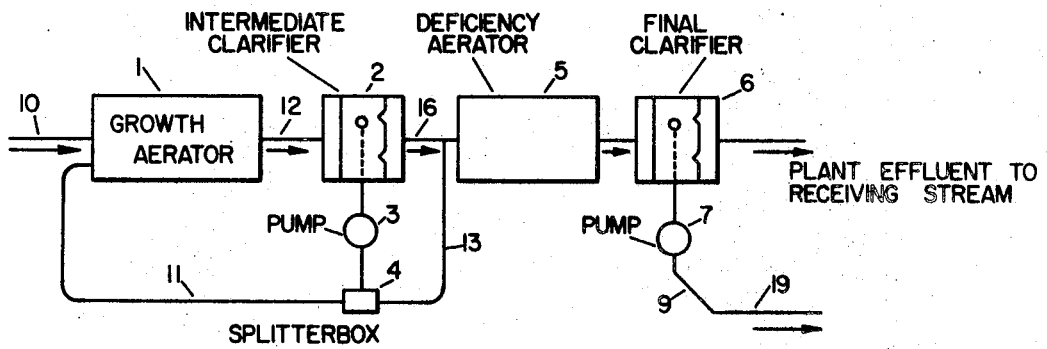
FIG. 2 — NO GROWTH SLUDGE WASTED
NO RECYCLING OF DEFICIENCY SLUDGE
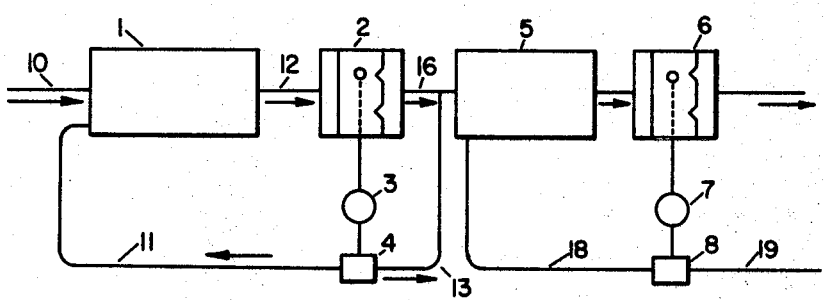
FIG. 3 — NO GROWTH SLUDGE WASTED
RECYCLING OF DEFICIENCY SLUDGE
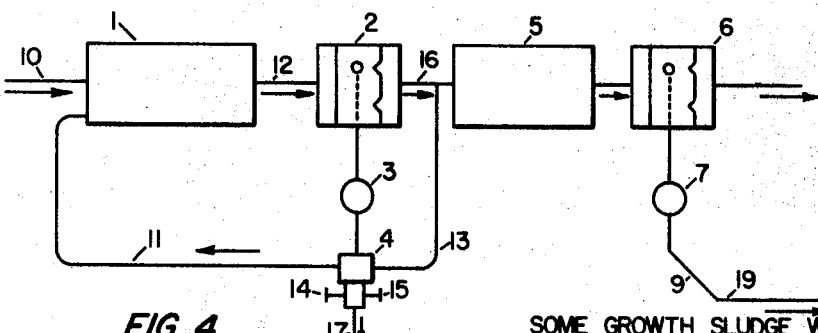
FIG. 4 — SOME GROWTH SLUDGE WASTED
NO RECYCLING OF DEFICIENCY SLUDGE
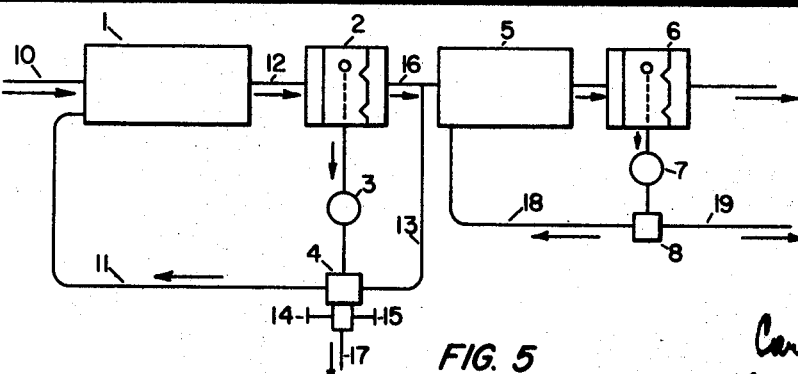
FIG. 5 — SOME GROWTH SLUDGE WASTED
RECYCLING OF DEFICIENCY SLUDGE
INVENTOR.
Carl Beer

"BIOLOGICAL" FLOW SHEET DEPICTING PROCESS VERSION OF FIGURE 2

"BIOLOGICAL" FLOW SHEET DEPICTING PROCESS VERSION OF FIGURE 4

CONVENTIONAL ACTIVATED SLUDGE

United States Patent Office 3,517,810
Patented June 30, 1970

3,517,810
LIQUID WASTE TREATMENT PROCESS
Carl Beer, Taborton Road, Sand Lake, N.Y. 12153
Filed May 23, 1968, Ser. No. 731,393
Int. Cl. C02c 1/06
U.S. Cl. 210—7                             1 Claim

ABSTRACT OF THE DISCLOSURE

In an activated sludge process for treatment of liquid wastes wherein, in sequence, waste is treated with heterogeneous microorganisms employing a first aeration step to form a mixed liquor of liquid treated waste and activated sludge particles in a growth aerator, the mixed liquor is settled to form an underflow of activated sludge slurry and an overflow of a second mixed liquor comprising liquid treated waste and a negligible quantity of activated sludge particles, the second mixed liquor overflow is aerated employing a second aeration step in a deficiency aerator to form a third mixed liquor of treated waste and sludge particles, and the third liquor is settled to form an overflow of treated waste and an underflow of substantially deactivated sludge slurry, the improvement by means of which removal of phosphates and other undesirable moieties from the second liquor overflow in the second aeration step is enhanced which comprises recirculating a first portion of said activated sludge slurry underflow to said first aerating step in a growth aerator, and introducing a second portion of said activated sludge slurry underflow to said aeration step in the deficiency aerator whereby only excess activated sludge contacts said mixed liquor in the deficiency aerator.

---

The present invention relates to a process for treating raw or partially treated sewage, industrial wastes or other wastes. The invention also relates to recovery of sludge containing high concentration of inorganic substances.

The conventional contemporary activated sludge treatment process involves the use of heterogeneous microorganisms for waste water purification. Raw sewage or sewage from which the coarse suspended matter has been removed enters an aeration tank. This fresh sewage is mixed intimately with microorganisms and liquid and subjected to vigorous aeration. Residence time for mixed liquor varies from two and one-half to twenty-four hours. Simultaneous purification steps include organic pollutant metabolism by activated sludge microorganisms and generation of new microorganisms, pollutant gasification, transformtion of organic solutes to inorganic solutes, pollutant oxidation, floc formation and colloidal and suspended pollutant adsorption to floc.

The limitations of the present activated sludge treatment processes are obvious. A conventional technique introduces pretreated sewage at the head end of the tank where it is mixed with return sludge. The head end portion of the tank is a rapid growth zone. The low end of the tank is a zone of nutritional deficiency where high uptake of phosphates will occur provided all pertinent process parameters are of the appropriate values. In the return sludge biota fatality, reduced efficiency during acclimation, desorption of pollutants and wasted space result.

The deficiency zone is eliminated in the step aeration type and completely mixed processes by introduction of pretreated sewage all along the tank, with resultant decrease in phosphate and pollutant removal efficiencies.

The present invention, on the other hand, promotes high phosphate uptake and high pollutant removal without wasting space during acclimation of microorganisms.

In view of the factors influencing waste treatment efficiency and waste effluent quality control, the present invention overcomes the foregoing limitations by accomplishing the following objects:

A principal purpose of this invention is to maximize removal of inorganic pollutants in waste effluents.

A further principal purpose of the invention is to eliminate wasted space in treatment facilities.

A further purpose of the invention is to eliminate biota fatality as a result of nutritional deficiency.

Other objects together with the foregoing are obtained by practicing the present invention as described herein and as illustrated in the accompanying drawings.

The foregoing disadvantages are avoided and the foregoing objects are accomplished by the practice of this invention, which briefly comprises a split culture, two phase activated sludge system.

Figure 1:
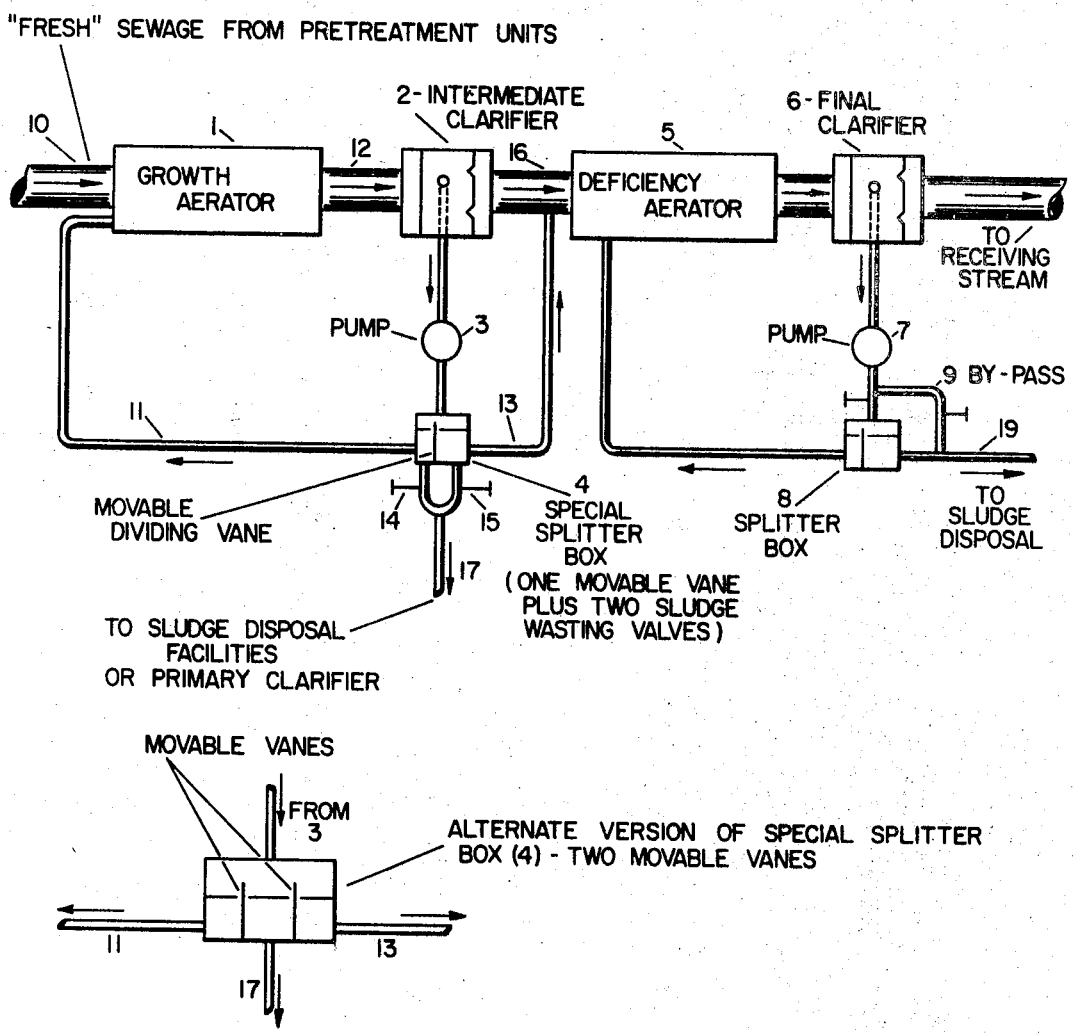

The practice of this invention is readily understood by reference to FIG. 1 which is a diagrammatic plan view of an activated sludge system suitable therefor. The diagram shows the treatment units, appurtenances and piping that are required for such a capability in symbolic fashion.

The four major process versions of this invention are illustrated by FIGS. 2, 3, 4 and 5. These figures are single line process flowsheets depicting the flow of the waste water and of the activated sludge through the various units of an appropriate system. Plant units carry the same identification numbers as in FIG. 1.

Figure 6:
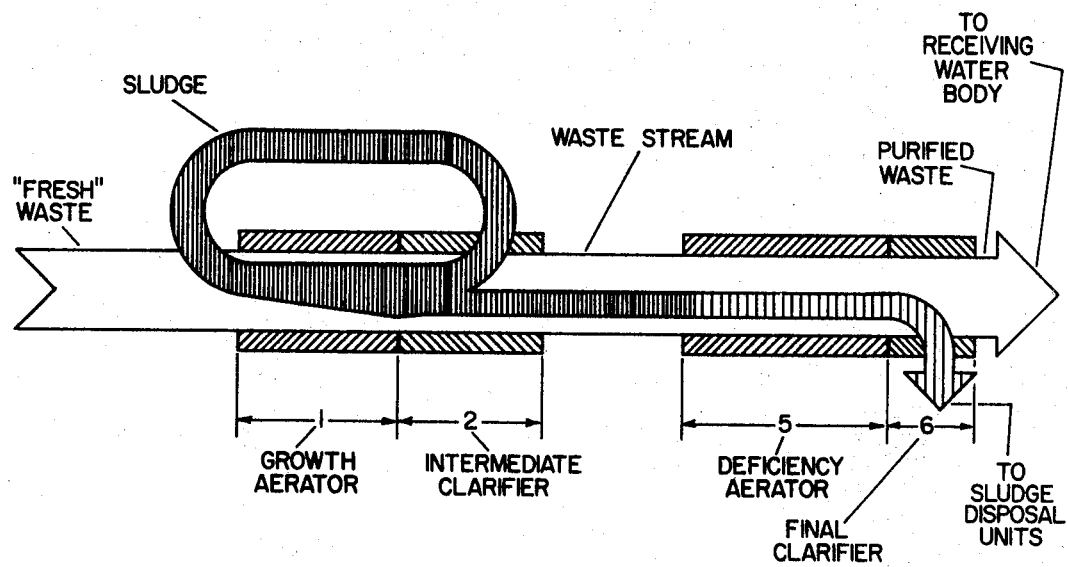
Figure 7:
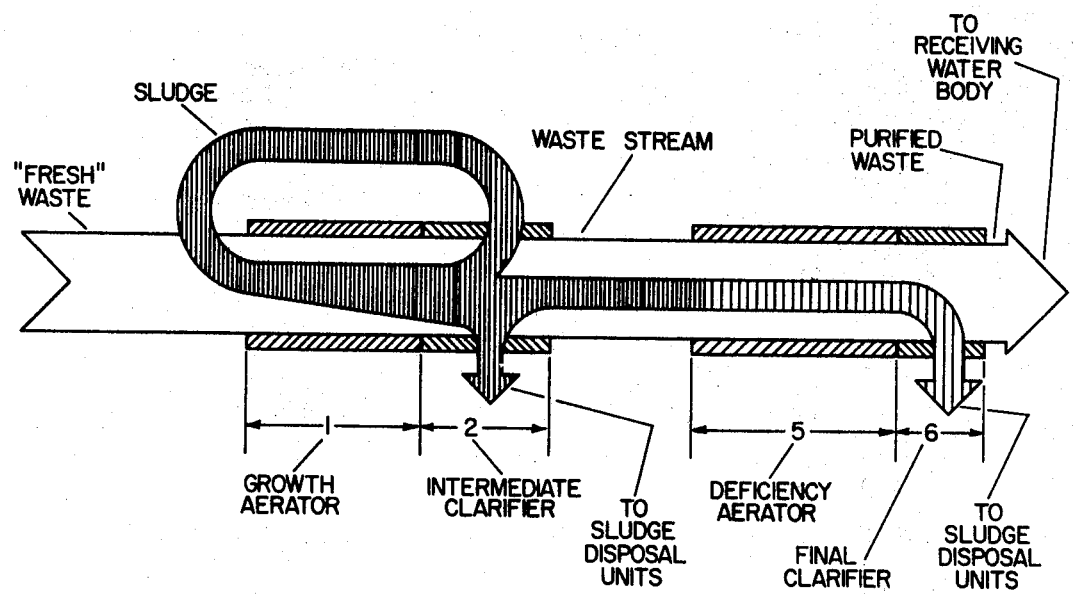

FIGS. 6 and 7 are "biological" flowsheets drawn up to illustrate more forcefully what happens to the activated sludge biota in the biological treatment units of an activated sludge system if process versions illustrated by FIGS. 2 and 4 are used. The flow of waste water and activated sludge is shown in pictorial fashion, sludge growth and sludge decay being indicated graphically. However, only the main plant units are shown; these are the aeration tanks and the clarifiers. Appurtenances and piping are omitted. The units shown carry the same numbers as in FIG. 1.

Figure 8:
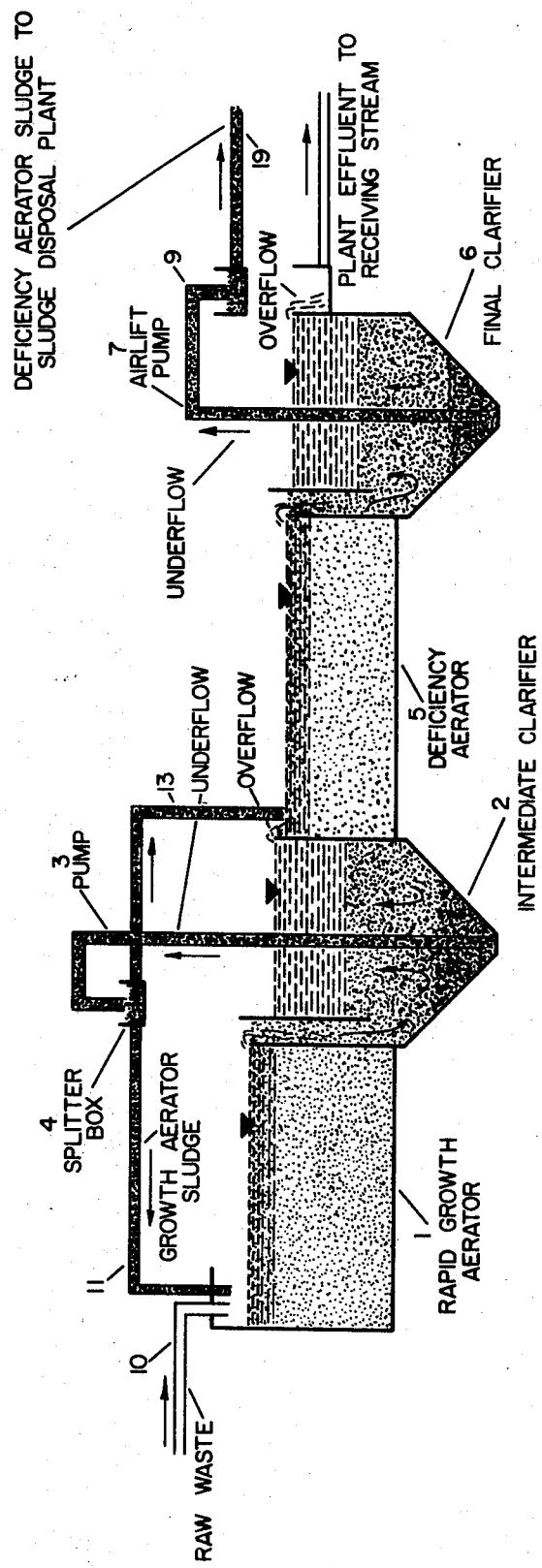

FIG. 8 is a cross section through the activated sludge system of FIG. 1 showing operation of the system for process version depicted in FIG. 2.

Referring now to FIG. 1, we notice that an activated sludge system capable of accommodating the four major process versions of this patent would essentially consist of:

(1) An activated sludge aeration tank equipped with high capacity aeration devices for the performance of a high synthesis aeration step. This aeration tank corresponds to the rapid growth aeration zone discussed in the description of the conventional activated sludge process and will be called "growth aerator" or "growth aeration tank" in this patent application.

(2) A clarifier or other liquid-solids separator for the separation of the growth aerator sludge from the waste water stream. This clarifier will be called "intermediate" clarifier.

(3) A pump to lift the underflow of the intermediate clarifier to splitter box 4.

(4) A (special) splitter box suitable for splitting up of the growth aerator sludge into two or three streams. Two versions of a splitter box are illustrated, one is equipped with one movable dividing vane and sludge wasting valves, the other is equipped with 2 movable dividing vanes.

(5) An activated sludge aeration tank for the performance of the second phase of the aeration process. This tank corresponds to the deficiency zone of the conventional activated sludge process and will be called "deficiency aerator" or "deficiency aeration tank."

(6) A clarifier or other liquid-solids separation device to separate the deficiency aerator sludge from the waste stream. This clarifier will be called "final clarifier."

(7) A pump to convey the underflow of the final clarifier to splitter box 8 or to "waste," that is, to the sludge treatment and disposal units.

(8) A splitter box for the splitting of the deficiency aerator sludge into two streams.

(9) A by-pass pipe line to be used in case all of the deficiency aerator sludge is "wasted" and splitter box 8 is not used.

(10) to (19) Various pieces of piping and valves.

Additional details concerning the plant units 1 to 9 are included in the description of the first process version given, that of process version FIG. 2.

Plant units carry the same identification members through FIGS. 1 to 8; for instance the growth aerator carries the identification number 1 in all diagrams.

In the following paragraphs, there is provided a description of four major process versions which illustrate preferred embodiments of this invention.

Referring now to process flowsheet FIG. 2 which shows the simplest version of the process of this invention, we notice that pretreated waste water enters growth aerator 1 through influent pipeline 10, that growth aerator return sludge enters the growth aerator through pipeline 11. Among the pretreatment devices for all versions of this activated sludge process, an equalization tank should be included.

In the growth aeration tank, a high synthesis activated sludge process takes place, with a high rate of new sludge formation. Liquid residence time for so-called domestic wastes should be at least 1½ hours. Sludge production will be approximately one pound of sludge for each pound of so-called 5-day biochemical oxygen demand oxidized. High capacity aeration systems—such a system is required for the growth aeration tank—are now commercially available. As far as the mixing pattern in the growth aerator goes, plug-flow regimes are usable.

Mixed liquor in the growth aerator is displaced, by the influent wastewater and by the return sludge, to the intermediate clarifier. In FIGS. 1 to 5, there is shown a short piece of piping 12 for the conveyance of the growth aerator effluent to the intermediate clarifier 2. FIG. 8 shows an alternative arrangement: the effluent of growth aerator 1 simply falls over a weir into the intermediate clarifier 2. This clarifier 2 may be a comparatively simple piece of equipment as no really thorough-going separation of solids and liquids is necessary. A simple upflow clarifier will suffice, as shown in FIG. 8. However, the conical bottom of the clarifier may be equipped with a rotating scraper and a fence, the former to keep the sludge from adhering to the walls and the latter to concentrate the sludge.

In the solids-liquid separator the "mixed liquor" issuing from the first phase aeration tank, the growth aerator, is separated into two fractions into an "over flow" or effluent fraction containing compartively little suspended solids, perhaps 20 to 80 milligram per liter dry weight and an "underflow" fraction containing a comparatively high concentration of suspended solids perhaps 8000 to 20,000 milligrams per liter. The "overflow" of the intermediate clarifier 2 is conveyed to the deficiency aerator 5.

By means of the lifting device 3—which may be an airlift pump, a plunger pump or a centrifugal pump—the "underflow" of the clarifier 2 is lifted to the (special) splitter box 4. The lifting device should have a variable capacity of delivery.

One version of the splitter box 4 is equipped with a movable vertical splitting vane which allows a split-up of the return sludge into two streams, one stream to be re-conveyed by pipeline 11 to the growth aerator, the other stream to be conveyed by pipeline 13 to the deficiency aerator and with two sludge wasting valves 14 and 15. Splitter boxes are common types of equipment, used in many activated sludge plants. However, it is the common use of splitter boxes to split the underflow of a clarifier into a portion to be "wasted" and a portion to be returned to the aeration tank. The common splitter boxes are not equipped with sludge wasting valves. The addition of these sludge wasting valves in process versions 4 and 5 allows a split of the underflow of the clarifier 2 into three portions; one portion to be returned to the growth aerator, one portion to be conveyed to the deficiency aerator, one portion to be "wasted." Two sludge wasting valves, instead of one, are provided, to facilitate control of the splitting operation.

The sludge wasting valves are not used in flowsheets FIGS. 2 and 3 and are therefore not shown in these two figures. The setting of the splitting vane and the positioning of the throttling elements in the sludge wasting valves will usually be done manually. Once these settings have been made, they will not be changed, unless plant load conditions vary drastically. Over a fairly wide range of contaminant load conditions, process versions FIGS. 2 and 3 are "self-leveling." If an equalization tank is used as a pretreatment device, the settings of the controls should be adjusted whenever the rate of plant flow is changed. As all other activated sludge processes, this process is less sensitive to changes in contaminant concentration than to changes in rate of flow. The degree of process stability is somewhat less for process versions as per FIGS. 4 and 5, if the splitter box just described is used. A splitter box equipped with two movable dividing vanes, however, as illustrated also in FIG. 1, provides good process stability for all the process versions of this patent.

In FIG. 1, a short piece of pipeline 16 is provided to convey the "overflow" of the intermediate clarifier 2 to the deficiency aerator. In FIG. 8, an alternative arrangement is shown: the "overflow" drops directly over a weir into the deficiency aerator.

For process versions as per FIGS. 2 and 3, the overflow of the intermediate clarifier is of the same volume as the influent wastes entering the growth aerator 1. For process versions as per FIGS. 4 and 5, the overflow of the intermediate clarifier is somewhat smaller, due to the wasting of some growth sludge through pipeline 17, which is shown only in FIGS. 4 and 5.

In the deficiency aerator, the major portion of the clarifying biological action that takes place there is accomplished by excess activated sludge produced in the growth aerator. In the process versions as per FIGS. 2 and 3, all the excess activated sludge of the growth aerator is utilized in the deficiency aerator. In the process versions as per FIGS. 4 and 5 only a portion of the excess activated sludge of the growth aerator is utilized in the deficiency aerator.

The basic differences between the activated aeration process used in the New York city area and the split culture two-phase process are very obvious. The present invention involves a two-phase system and permits high synthesis. The activated aeration process involves two single phase systems and does not permit high synthesis.

If flowsheets as per FIGS. 3 and 5 are used, some proliferating bacterial growth may occur in the deficiency aerator, because these flowsheets provide for the recirculation of deficiency aerator sludge. When flowsheets as per FIGS. 2 and 4 are used, very little proliferation of bacteria will occur in the deficiency aerator.

In all the four process versions of this application, such activated sludge bacteria as are suspended in the effluent of the growth aerator 1 and as do not settle out in the intermediate clarifier 2 will also partake in the biologic action that occurs in the deficiency aerator. It is because of this fact that a very good solids-liquid separation in the intermediate clarifier is not important.

Waste water residence time in the deficiency aerator will of course vary with the type of wastes treated and with the degrees of purification required; however, for ordinary municipal waste a liquid residence of 2 hours in the deficiency aerator, which is of course additive to the liquid residence time in the growth aerator, will give a high treatment efficiency. High capacity aeration equipment will not be required for the deficiency aerator as no or very little synthesis takes place here. A "plug flow" flow regime should be used for the deficiency aerator.

Mixed liquor in the deficiency aerator is displaced, by the influent waste water and growth aerator sludge, to the final clarifier 6 where the solids are separated from the liquid phase as carefully as possible. The underflow of the final clarifier is pumped to sludge treatment and disposal facilities by pump 7 via by-pass 9.

Turning now to flowsheet FIG. 3 we notice that this process version is in all respects the same as the one illustrated by flowsheet FIG. 2 except that FIG. 3 provides for the recirculation of deficiency aerator sludge. Pump 7 will lift the underflow of clarifier 6 to splitter box 8 which is an ordinary splitter box as they are commonly used in activated sludge plants. In splitter box 8, the underflow of the final clarifier 6 is split into two steams: return sludge will be reconveyed to the deficiency aerator 5 via pipeline 18, waste sludge will be discharged to the sludge treatment and disposal units via pipeline 19.

The liquid residence time in hours, at which an aerator is operated may be obtained by dividing the inflow rate per hour into the liquid volume found in the aeration tank. In case that there is no appreciable growth or fatality of bacteria in the aerator—which is true of the deficiency aerator—the solids residence time in the aerator may be similarly found by dividing the hourly inflowing dry weight of solids into the dry weight of solids "at work," that is suspended, in the liquid mass of the aerator.

In a deficiency aerator without recirculation the solids concentration in the deficiency aerator is, of necessity, equal to the solids concentration in the influent to the aerator (pipeline 16 plus pipeline 13) and the solids residence time equal the liquid residence time. In a deficiency aerator with recirculation of sludge, the solids concentration in the aerator will be higher than the solids concentration in the influent and solids residence time will be longer than liquid residence time.

Within certain limits, the purification effect of an aeration tank is dependent on the product of solids concentration and liquid residence time. In other words, solids concentration may be substituted for liquid residence time. This means that sludge recirculation devices may be substituted for aeration tank volume, minimizing plant space requirement.

A comparison of flowsheets FIGS. 4 and 5 with flowsheets FIGS. 2 and 3 indicates that the former are respectively identical to the latter except for the provision of facilities for wasting some growth aerator sludge in the former through pipeline 17.

"Wasting" of some growth sludge will become necessary if an influent sewage contains an unusually high portion of organic pollutants or an unusually low portion of certain inorganic pollutants.

In the "biologic" flowsheet FIG. 6, the quantity of sludge biota is indicated by the width of the sludge arrow, the quality of viability of the biota is indicated by the density of the arrow hachures. Dense hachures indicate a healthy sludge; wide-spaced hachures indicate a sludge which does not grow, which barely exists. The waste water stream which flows first through the growth aerator then through the deficiency aerator is represented by an arrow of unchanging width without hachures. Strictly speaking, the waste flow diminishes somewhat each time some sludge is sent to the sludge treatment and disposal units. However, the extent of change is so small that it would not show in the diagrams. It should be noted in this connection that the "biological" flowsheets are not drawn to scale. Sludge flow is greatly magnified in comparison to waste water flow.

The growth aerator 1 of FIG. 6, shows how both the waste stream and the return sludge stream enter that aerator, flowing from left to right in the diagram. At the head end of the tank, the sludge arrow is comparatively narrow. The arrow widens continuously while the sludge flows, together with the waste water, from left to right through the aerator tank 1. This indicates continuous growth—proliferation—of the bacteria as they flow through the aerator 1. The hachures remain densely spaced throughout the growth aerator. This means that the sludge stays healthy and the biota proliferate all the time. No deterioration of return sludge from the intermediate clarifier 2 to the head end of the growth aerator 1, is indicated. Actually, there is a slight deterioration of sluge during this transfer which, however, is too slight to show, if the plant is well designed.

In the intermediate clarifier 2, the sludge stream is divided into two substreams: one substream is reconveyed to the head end of the growth aeration tank, the other is conveyed forward to the deficiency aerator 5.

In the deficiency aerator 5, very little proliferation takes place; the sludge arrow stays at the same width. However, the quality of the sludge deteriorates in the deficiency aerator 5. This is indicated by wider and wider spaces between the hachures.

In the final clarifier 6, the deteriorated sludge is separated from the waste stream and "wasted," that means conveyed to the sludge treatment and sludge disposal units which are not shown on our diagrams.

Flowsheet FIG. 7 is drawn in the same fashion as flowsheet of FIG. 6 and depicts the sludge and wastewater flows of process version FIG. 4. Except for the indication of some "wasting" of growth aerator sludge, FIGS. 6 and 7 are alike.

In FIG. 6, the intermediate clarifier 2 splits the sludge into two portions, one of which is returned to the growth aerator the other of which is conveyed to the deficiency aerator. In FIG. 7, the intermediate clarifier 2 splits the sludge into three portions, one of which is returned to the growth aerator, the sceond of which is conveyed to the deficiency aerator, the third of which is "wasted."

Cross section FIG. 8 again shows an activated sludge system arranged to produce process version FIG. 2. Sludge concentration is indicated by dots.

Both economic advantages and increased efficiency are available as a result of the present invention. Only the conventional activated sludge process is used as a reference standard since only that process is comparable in contaminant removal efficiency.

The economic advantages of the present process result because return of sludge from the deficiency zone to the growth zone is avoided in the new process. Under the conventional process return sludge entering the growth zone of the aeration tank must be reacclimated—"turned around" as it were—to rapid growth. During this period of reacclimation, very litle purification takes place and the space occupied by the activated sludge biota during this period is wasted. Similarly considerable space in the deficiency zone is wasted since many pollutants picked up in that zone are desorbed by the return sludge when same enters the head end of the tank.

The increased efficiency of the subject process arises chiefly from two process condition modifications:

(a) Under the conventional activated sludge process no really high synthesis process is possible. This means that certain pollutants—above all nitrogen—cannot be assimilated to the extent possible in a high synthesis process. The new process, on the other hand, permits a real high synthesis process. A high synthesis process is not possible in the conventional system because activated sludge biota are severely damaged in the deficiency zone and cannot, therefore, develop their full assimilative capacity after return to the growth zone. Under the new process of this patent, no seed biota are ever passing through the deficiency zone.

(b) Under the conventional system the activated sludge biota release much secondary pollution to the waste stream in the deficiency zone as a result of biota nutritional deficiency, fatality and decomposition; under the new system, biological conditions in the deficiency zone may be controlled much closer than in the conventional system.

Figure 9:
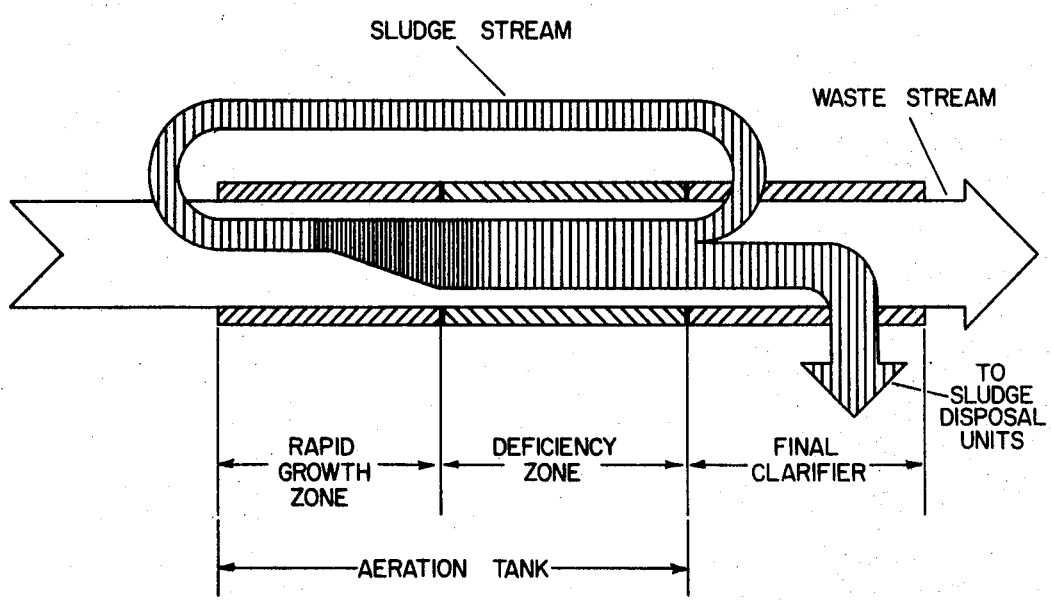

We are turning now to FIG. 9, a "biological" diagram of the conventional activated sludge process; when drawing FIG. 9 we used the same graphical method of symbolizing sludge growth and sludge decay that we used for FIGS. 6 and 7. A comparison of FIG. 9 with FIGS. 6 and 7 reveals some of the advantages of the new process. In FIGS. 6 and 7 return sludge enters the rapid growth zone in a healthy vigorous state, ready to resume rapid growth. This is indicated by the close spacing of the hachures in the sludge arrow as it enters the aeration tank. In FIG. 9 however, that is, in the conventional activated sludge process, return sludge enters the rapid growth zone in an emaciated, half-starved state indicated by wide spacing of the sludge arrow hachures. In the growth zone of FIGS. 6 and 7, sludge growth starts immediately after the return sludge has entered that zone. This is indicated by the increase in arrow width which starts at the entrance of that arrow into the growth zone. In FIG. 9 on the other hand, the sludge band stays at the same width for the first portion of the growth aerator, while the spacing of the hachures becomes closer and closer. This is the period of "turn-around" or sludge reacclimation. Only after this period has been survived by the activated sludge biota can they start to grow, to proliferate. This is indicated by the widening of the sludge arrow. The fact that no seed sludge is ever carried through the deficiency zone of the new process, while all the seed sludge, that is the return sludge, is taken through that zone under the conventional activated sludge process may also be seen quite readily by a comparison of FIG. 9 (conventional activated sludge) with FIGS. 6 and 7. However, the qualitative advantages of the new process described in section $b$ of the preceding paragraph cannot be pictured graphically.

I claim:
1. In an activated sludge process for treatment of liquid wastes wherein, in sequence, waste is treated with heterogeneous microorganisms employing a first aeration step to form a mixed liquor of liquid treated waste and activated sledge porticles in a growth aerator, the mixed liquor is settled to form an underflow of activated sludge slurry and an overflow of a second mixed liquor comprising liquid treated waste and a negligible quantity of activated sludge particles, the second mixed liquor overflow is aerated employing a second aeration step in a deficiency aerator to form a third mixed liquor of treated waste and sludge particles, and the third liquor is settled to form an overflow of treated waste and an underflow of substantially deactivated sludge slurry, the improvement by means of which removal of phosphates and other undesirable moieties from the second liquor overflow in the second aeration step is enhanced, which comprises recirculating a first portion of said activated sludge slurry underflow to said first aerating step in the growth aerator, and introducing a second portion of said activated sludge slurry underflow to said second aeration step in the deficiency aerator.

References Cited
UNITED STATES PATENTS 2,786,025  3/1957  Lamb et al. _____ 210—5

OTHER REFERENCES

Imhoff, K., et al., Sewage Treatment, 2nd ed., 1956, John Wiley & Sons, New York, p. 155 relied on.

Chasick, A. H., activated aeration, etc., Sewage and Ind. Wastes, vol. 26, September 1954, pp. 1059–1068.

MICHAEL E. ROGERS, Primary Examiner

U.S. Cl. X.R.

210—5, 9